United States Patent [19]

Owen

[11] Patent Number: 5,795,058
[45] Date of Patent: Aug. 18, 1998

[54] COLOR IMAGE PROTECTION APPARATUS

[75] Inventor: Keith James Owen, Birmingha, United Kingdom

[73] Assignee: Light & Sound Design, Ltd., Edinburgh, United Kingdom

[21] Appl. No.: 381,967
[22] PCT Filed: Aug. 11, 1993
[86] PCT No.: PCT/GB93/01700
 § 371 Date: Feb. 14, 1995
 § 102(e) Date: Feb. 14, 1995
[87] PCT Pub. No.: WO94/04951
 PCT Pub. Date: Mar. 3, 1994

[30] Foreign Application Priority Data

Aug. 15, 1992 [GB] United Kingdom ............ 9217392

[51] Int. Cl.⁶ ..................................... F21V 9/00
[52] U.S. Cl. ........................ 362/293; 359/890; 353/84
[58] Field of Search ................. 362/293, 317; 359/890, 891; 430/321; 353/31, 84

[56] References Cited

U.S. PATENT DOCUMENTS

| | | | |
|---|---|---|---|
| 3,914,464 | 10/1975 | Thomasson et al. | 427/54 |
| 4,779,176 | 10/1988 | Bornhorst | 353/84 X |
| 4,800,474 | 1/1989 | Bornhorst | 362/293 |

FOREIGN PATENT DOCUMENTS

| | | |
|---|---|---|
| A 0 181 770 | 5/1986 | European Pat. Off. . |
| A 0 248 974 | 12/1987 | European Pat. Off. . |
| A 0 253 081 | 1/1988 | European Pat. Off. . |
| A 59-152 407 | 8/1984 | Japan . |
| 1 441 745 | 7/1976 | United Kingdom . |

Primary Examiner—Stephen F. Husar
Attorney, Agent, or Firm—Fish & Richardson P.C.

[57] ABSTRACT

A transparency intended for use in a high intensity light beam projector for stage lighting purposes, comprises a glass substrate (10) having selected areas (11) thereof coated with a multi-layer dielectric coating forming a dichroic color filter. Selective coating is effected either by removing parts of an overall multi-layer coating through a mask, or by applying the multi-layer coating selectively through a mask.

21 Claims, 5 Drawing Sheets

COLOR IMAGE PROTECTION APPARATUS

This invention relates to colour pattern projection apparatus for projecting a colour pattern as part of a stage lighting scheme.

It is already known in stage lighting systems to use a so called gobo, which is effectively a partially transparent slide through which a light beam is passed. With appropriate focusing arrangements, a sharp image of the gobo can be formed on an illuminated subject. It is also known to provide a mounting arrangement allowing a gobo to be rotated, so that the image referred to rotates.

The present invention has for its object to provide an apparatus which can be used to project a bright image in a coloured light beam and the principle problem to be overcome in such an apparatus is the provision of a transparency which can withstand the high temperatures existing in the environment of a stage light projector.

In accordance with the broadest aspect of the invention there is provided a transparency comprising a glass substrate capable of withstanding high temperatures, said substrate having selected areas thereof coated with layers of dielectric material such that it acts as a dichroic filter.

Such filters absorb little heat when placed in a light beam, unlike pigment filters, and can therefore withstand the passage of a high intensity light beam therethrough.

In accordance with another aspect of the invention, there is provided a light beam projector comprising a light source, an optical system for concentrating light from said light source into a beam and a transparency as defined above situated in said light beam in such a position relative to said optical system that a focused image of the pattern on the transparency can be formed.

Preferably the transparency is mounted for rotation in the light beam.

Furthermore the projector may comprise a colour changer so that light passing through clear areas of the transparency is coloured by said colour changer and light passing through the coated areas of the transparency has a colour determined by the subtractive mixing effect of the colour changer and the coated areas of the transparency.

The transparency is preferably made by coating a dichroic filter with a layer of metal selectively removing areas of the metal coating so that the metal layer provides a mask and dry etching away the exposed dielectric layers, for example by laser etching. The remainder of the metal layer is then removed.

Conveniently, the metal layer is selectively removed by acid etching initially through a photographically formed etch resist mask formed over the metal layer. The remainder of the metal layer is similarly removed by acid etching after removal of the photo mask.

Alternatively, the transparency may be manufactured by applying a mask directly to the glass substrate and vacuum depositing the dielectric material on to the substrate through the mask. With this arrangement a series of masking and coating steps may be carried out so that different areas of the substrate have different filter properties and colour transmitted light differently.

Figure 1:
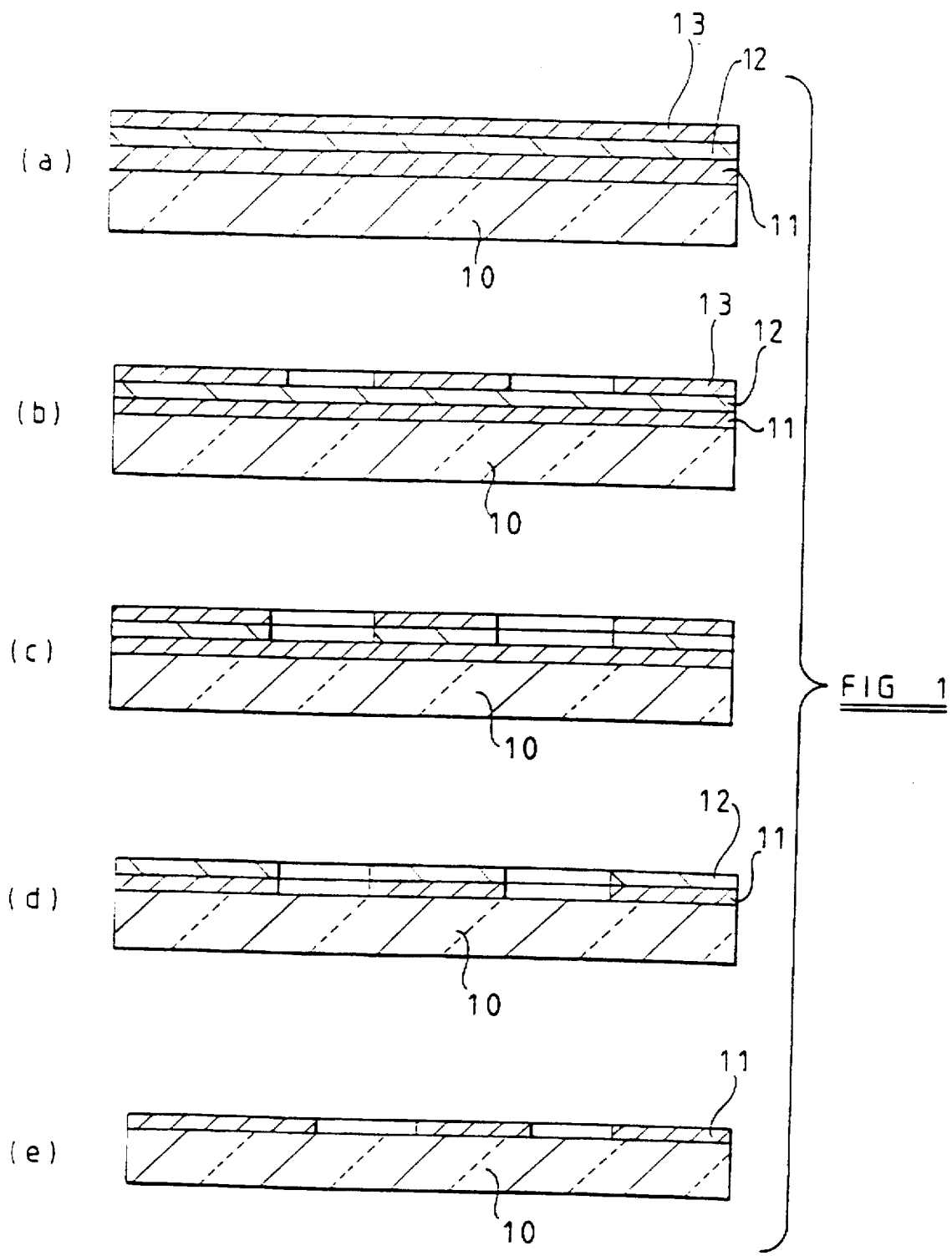
FIGS. 1 and 2 are diagrammatic sectional views illustrating the steps involved in manufacturing two different exemplary embodiments of the invention.

Referring firstly to FIG. 1, the transparency at the heart of the present invention is in the form of a disk of glass 10 which has one face selectively coated with areas of multilayer dielectric film 11 which acts as a dichroic filter. The areas form a pattern on the glass disk.

The selective coating of the disk is effected by coating it all over with multi-layer dielectric film in known manner by sputtering on to it alternate layers of high and low refractive index dielectric materials such as titanium dioxide and silicon dioxide. Other dielectric materials can of course be used. Parts of the film are then selectively removed. To assist in such removal, a further coating of metal film 12 (such as chromium) is first formed on the dielectric film and a coating of a photo-resist film 13 is provided over the metal film 12 (FIG. 1a). The desired pattern is photo-exposed on the photo-resist film which is then developed so that unexposed areas of the film are washed off (FIG. 1b). The areas of chromium film left exposed through the holes 13a in the photo-mask thus formed are next removed by acid etching (FIG. 1c). Then the areas of the multi-layer dielectric film now exposed are removed by dry etching using a known laser technique (FIG. 1d). Finally, the mask is stripped off and the remainder of the chromium film is removed by acid etching (FIG. 1e).

There thus remains a disk of glass with a pattern of areas of multi-layer dielectric film thereon forming a patterned dichroic filter. When the disk is placed in a light beam the dichroic filter areas will reflect selective components of the light and pass the remainder. Light passing through the areas where the dielectric film has been removed, will be unchanged in colour.

Figure 2:
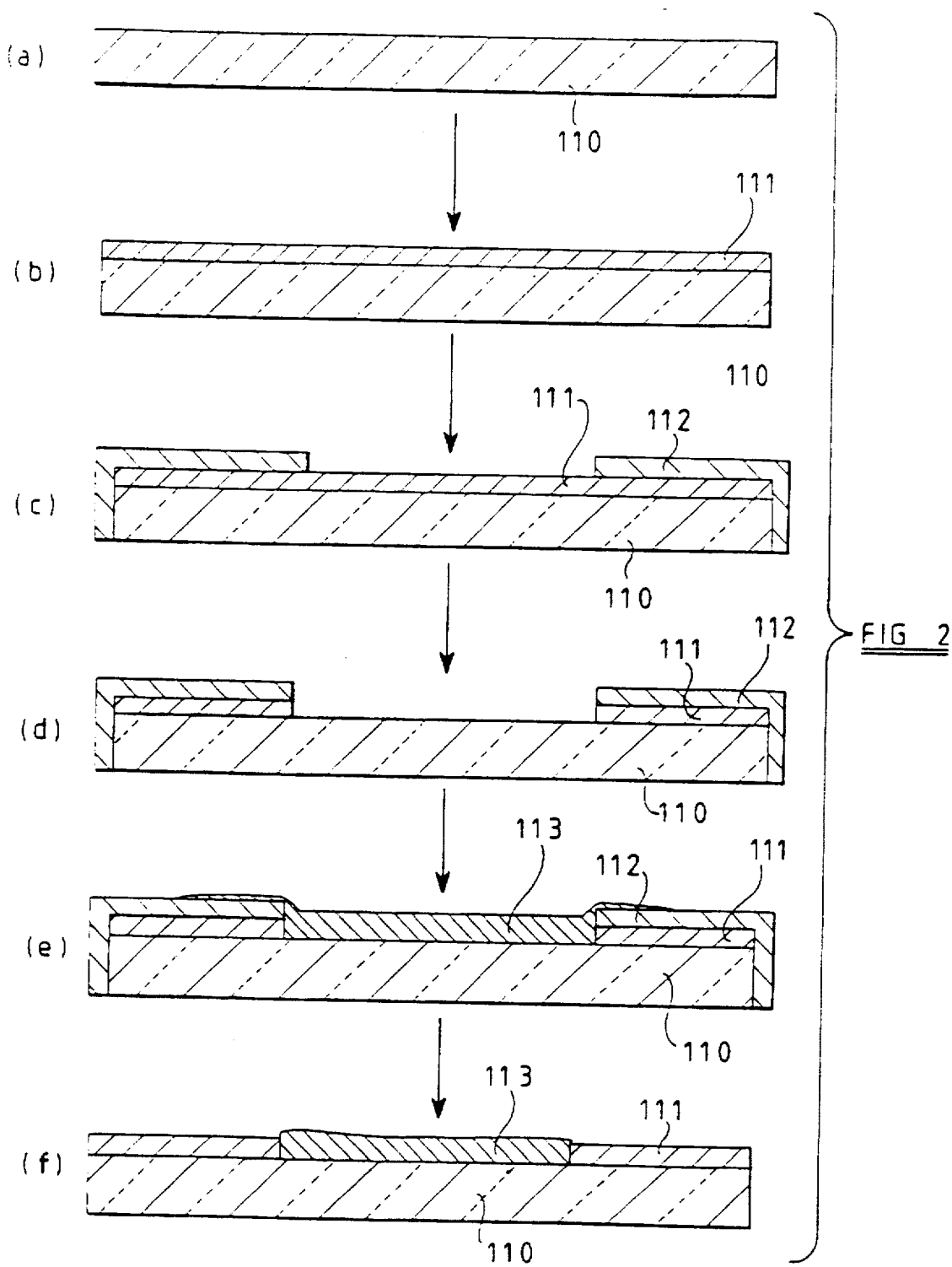

FIG. 2 illustrates an alternative procedure by means of which a transparency can be made with complementary areas of two different colours. As shown in FIG. 2 a glass substrate 110 is first provided over the whole of one face with a multi-layer dielectric coating 111 of a first colour and this is then covered by a rigid mask 112 mechanically clamped to the substrate. This mask 112 is formed with holes in a pattern matching the required pattern of areas from which the first colour is to be removed. Removal is effected as above by dry etching using a layer. The second colour is now applied by sputtering on multiple layers of dielectric materials 113 through the holes in the mask. The mask 112 is finally removed to provide the two colour transparency. A third colour could similarly be applied by dry etching and sputtering through a different mechanically clamped mask and so on.

Figure 5:
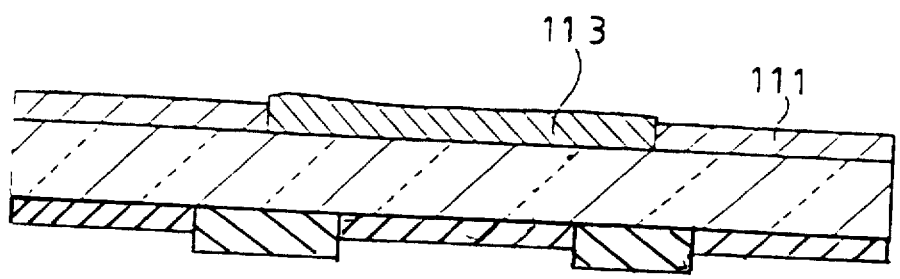
FIG. 5 shows an embodiment with dichroic elements located on both sides of the glass substrate.

Many variations of the processes described above can be employed. For example, differently coloured dichroic filter coatings could be provided on both sides of a glass substrate and differently shaped transparent patterns dry etched into opposite sides giving a three colour effect by subtractive colour filtering where coloured areas overlap. An exemplary device showing differently colored dichroic filter coatings on opposite sides of the substrate 110 is shown in FIG. 5.

Figure 3:
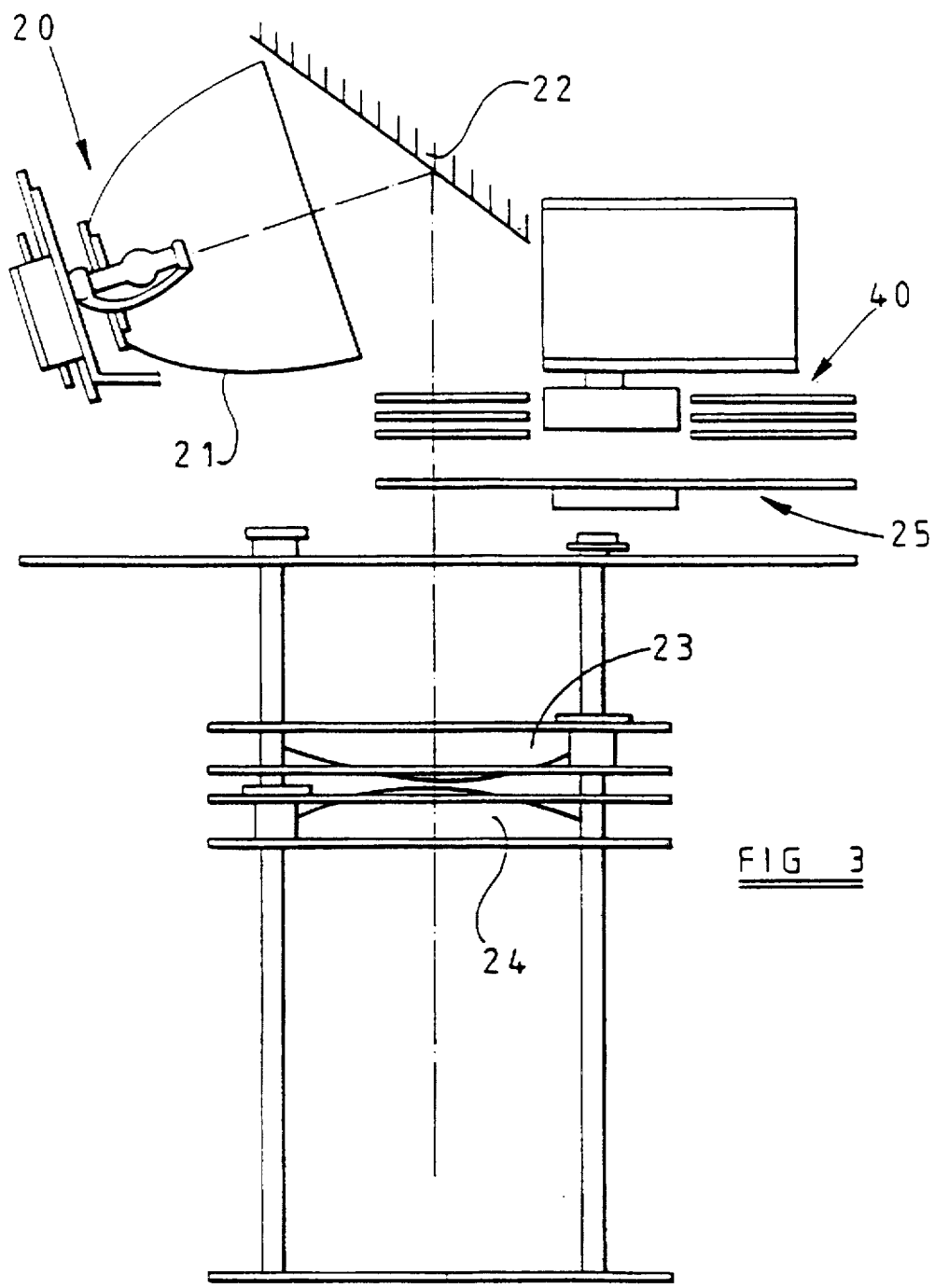
FIG. 3 is a diagrammatic view of a light beam projector in accordance with the invention.
Figure 4:
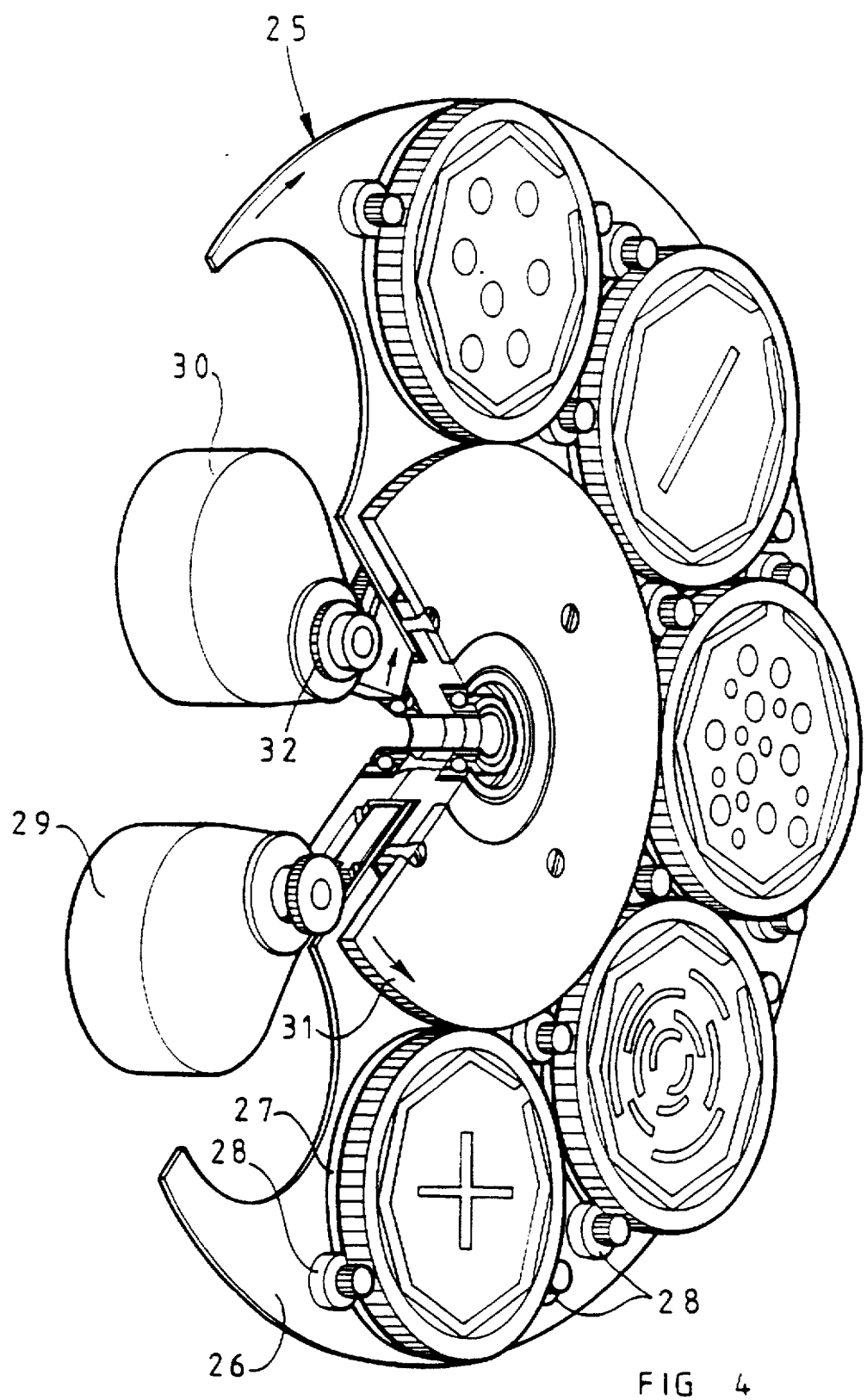
FIG. 4 is a diagrammatic perspective view of a multiple gobo wheel arrangement forming a part of the light beam projector.

FIGS. 3 and 4 illustrate the use of the transparency describe above in a light beam projector, intended primarily for use in the lighting of stage shows and the like. The projector comprises a light source 20 which comprises a high temperature arc lamp. This is located at the focus of a reflector 21 forming, together with a plane reflector 22 and a pair of lens elements 23, 24 an optical system. The lens elements 23, 24 are independently movable axially of the light beam reflected by plane reflector 23 and can focus on a distant surface an image of the pattern on the transparency which is mounted on a multiple gobo wheel arrangement 25.

The gobo wheel arrangement 25 is shown in more detail in FIG. 4 and includes a main wheel 26 rotatable about its own axis which is spaced from and parallel to the axis of the light beam. The wheel 26 is formed with a series of equi-angularly spaced circular openings over some or all of which differently designed transparencies are mounted. Each transparency is mounted in a circular rim 27 carried in bearings 28 on the wheel 20 so that the transparency can be rotated on its own axis, which is coincident with the beam axis when the particular transparency is located at working position. The wheel 25 can be turned by a remotely controlled motor 29 to position any of the transparencies or an unused opening in the wheel 26 at the working position.

A gobo-rotator motor 30 is provided for rotating all the transparencies simultaneous. Each of the rims 27 has external gear teeth and these all mesh with a driving gear 31 mounted co-axially with the wheel 26. The motor 30 drives this gear 31 via a gear 32 on its shaft.

With this arrangement the focused image of the colour pattern formed on the transparency at the working position can be rotated. When a single colour transparency is employed the focused image will, in the absence of any other colour filters in the system comprise a pattern of illumination in white and a single colour of light.

The projector also includes, however, a colour changer system 40, utilising three independently rotatable colour wheels each of which carries a plurality of differently coloured dichroic filter elements. When this colour changer is in use (i. e. when a colour filter in one or more of the colour wheels is positioned in the light beam) the light incident on the transparency in the working position of the gobo-wheel arrangement, will be coloured according to the filter or filters it has already passed through. The coated pattern areas of the transparency change the colour of the light transmitted subtractively, whereas light passing through the clear areas is unchanged. The resulting image is thus in two different colours, rather than in white and a single colour.

The use of a dielectric layer selectively applied to a transparent substrate to form a transparency is advantageous in that a dichroic filter operates without absorbing an excessive amount of heat from the light beam passing through it. Transparencies formed from selectively applied pigments do not have this advantage.

I claim:
1. A light beam projector comprising:
a light source,
an optical system for concentrating light from said light source into a beam;
a transparency, having a glass substrate capable of withstanding high temperatures, said substrate having selected areas thereof coated with layers of dielectric material such that it acts as a dichroic filter, said transparency situated in said light beam in such a position relative to said optical system that a focused image of a pattern on the transparency can be formed; and
a colour changer such that light passing through clear areas of the transparency is coloured by said colour changer and light passing through the coated areas of the transparency has a colour determined by the substrative mixing effect of the colour changer and the coated areas of the transparency.

2. A dichroic light pattern generator, comprising:
a transparent substrate having at least one light passing surface and an oppositely facing other light passing surface;

a selective dichroic coating at least on said one surface, said selective dichroic coating formed having an edge that defines a pattern representing a desired shape of a light beam to be projected, said coating formed of a dichroic material which reflects infrared radiation and avoids heat buildup in said dichroic coating; and a color changer, separate from said transparent substrate, and positioned such that light passing through the coated areas of the transparent substrate has a colour determined by a subtractive mixing effect of the colour changer and the coating on the transparent substrate.

3. A generator as in claim 2 wherein said selective dichroic coating pattern is in the desired shape of the light beam.

4. A generator as in claim 2, wherein said selective dichroic coating pattern is in a complement of a shape of the desired light beam.

5. A generator as in claim 2 wherein said dichroic material includes a first high refractive index dielectric material adjacent to a low refractive index dielectric material.

6. A generator as in claim 2 wherein said dichroic material has a characteristic to reflect selective components of light impinging on said dichroic material, and to pass other components of light, said other components being different than said selective components, impinging on said dichroic material, said other components representing a desired color of light to be seen.

7. A dichroic light pattern generator as in claim 2, further comprising a light source, producing a light beam which is coupled to said light passing surface, said dichroic coating changing a shape of light transmitted by said light source.

8. A dichroic light pattern generator, comprising:
a transparent substrate having at least one light passing surface and an oppositely facing other light passing surface; and a selective dichroic coating on said one surface, said selective dichroic coating formed having an edge that defines a pattern representing a desired shape of a light beam to be projected, said coating formed of a dichroic material which reflects infrared radiation and avoids heat buildup in said dichroic coating;

a color changer, separate from said transparent substrate, and position such that light passing through the coated areas of the transparency has a colour determined by a subtractive mixing effect of the colour changer and coating on the transparency;

a light source, producing a light beam which is transmitted to said light passing surface, said dichroic coating changing a shape of light transmitted by said light source; and a second selective dichroic coating on said oppositely facing other light passing surface, and in a different pattern than said dichroic coating on said one surface, one of said dichroic coatings completely reflecting all light which is passed therethrough in order to shape a pattern of a beam.

9. A dichroic pattern generator comprising:
a substrate of an optically transmissive material;
a first dichroic material coated on said substrate to reflect first light components;
a second dichroic material coated in a location to reflect second light components, different than said first light components; and
said first dichroic material formed into a pattern having an edge representing a desired shape of a light beam to be projected, and said second dichroic material overlapping said pattern, to project, when illuminated, an optical image having at least one part which is filtered by a subtractive effect of said reflection of said first light component combined with said reflection of said second light component.

10. A dichroic pattern generator as in claim 9 wherein said substrate has a first light passing surface and an oppositely facing second light passing surface, and wherein said first dichroic material is coated on said first light passing surface and said second dichroic material is coated on said second light facing surface.

11. A pattern generator as in claim 10 further comprising a light source, projecting a light beam toward said substrate.

12. A pattern generator as in claim 9 wherein said second dichroic material is coated on at least a part of said first dichroic material.

13. A pattern generator as in claim 9 wherein said second dichroic material is coated on an opposite surface of said substrate.

14. A pattern generator as in claim 10 wherein said selective dichroic coating pattern is in the shape of the desired light beam.

15. A pattern generator as in claim 10, wherein said selective dichroic coating pattern is in the shape of a complement of a shape of the desired light beam.

16. A patterned light beam projector, comprising:

an optically transparent substrate, having a first light passing surface and a second light passing surface facing generally away from said first light passing surface;

a first dielectric material having an edge that defines a first pattern, coated on said first light passing surface to selectively change a color of light according to said first pattern;

a second dielectric material, coated on at least part of said second light passing surface to change a color of light passing through said second dielectric material; and said first and second dielectric materials having different light color altering characteristics.

17. A patterned light beam projector as in claim 16 wherein said first and second dielectric materials are dichroics.

18. A patterned light beam projector as in claim 17, wherein said second dielectric material is in the form of a pattern, at least a portion of which overlaps said first pattern, and wherein a three color effect is formed.

19. A patterned light beam generator as in claim 16 wherein said second dielectric material which is coated on said second light passing surface, has an edge that defines a second pattern, different than said first pattern.

20. A patterned light beam generator as in claim 19 further comprising a light source, projecting light to said substrate which selectively passes certain components of that light.

21. A patterned light beam projector, comprising:

a high intensity light source, of a type which produces heat, producing light;

an optical system, operating to focus said light;

a first color filter, optically in series with said high intensity light source and said optical system, said first color filter selectable between different colors to pass a filtered version of said light which is selectively filtered; and an optically transparent substrate, having a first light passing surface and a second light passing surface facing generally away from said first light passing surface, a first dielectric material having an edge that defines a first pattern, coated on said first light passing surface to selectively change a color of light according to said first pattern, a second dielectric material, coated on at least part of said second light passing surface to change a color of light passing through said second dielectric material, said first and second dielectric materials having different light color altering characteristics, and said said first pattern being different than a coating of said second dielectric material.

* * * * *